Aug. 12, 1969  D. W. WHITE, JR  3,460,991
FUEL CELL WITH TUBULAR ELECTRODES
AND SOLID ELECTROLYTE
Filed Aug. 16, 1967  2 Sheets-Sheet 1
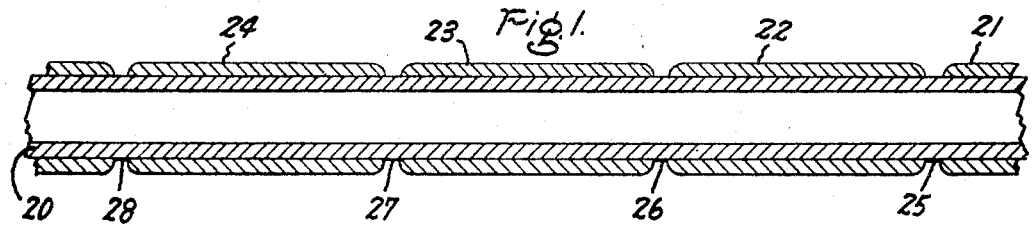
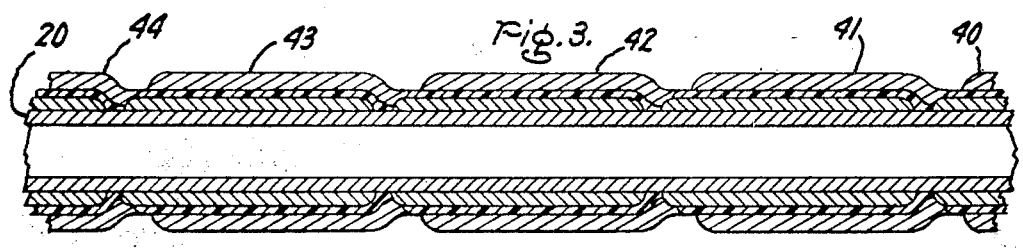
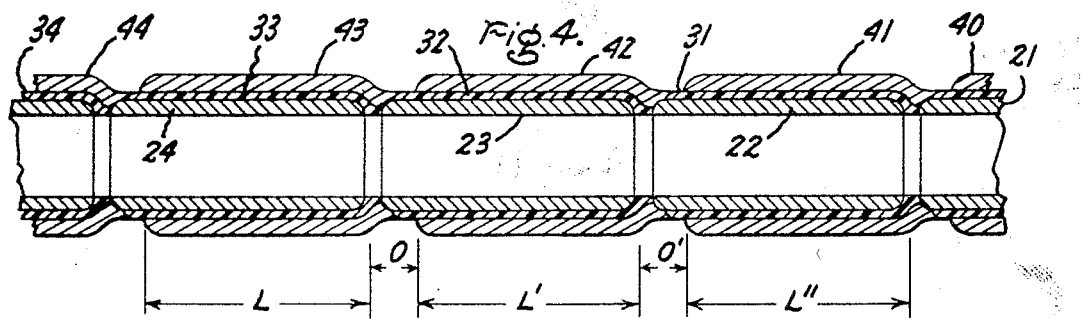
Inventor:
Donald W. White, Jr.,
by [signature]
His Attorney United States Patent Office 3,460,991
Patented Aug. 12, 1969

3,460,991
FUEL CELL WITH TUBULAR ELECTRODES AND SOLID ELECTROLYTE
Donald W. White, Jr., Burnt Hills, N.Y., assignor to General Electric Company, a corporation of New York
Continuation-in-part of application Ser. No. 465,624, June 21, 1965. This application Aug. 16, 1967, Ser. No. 661,006
Int. Cl. H01m 27/02
U.S. Cl. 136—86    3 Claims

ABSTRACT OF THE DISCLOSURE

A high voltage fuel cell assembly in which each cell comprises inner and outer tubular electrodes and a solid tubular electrolyte sandwiched between the electrodes.

---

This is a continuation-in-part of my copending application Ser. No. 465,624, filed June 21, 1965 and assigned to the assignee hereof.

This invention relates to an improved high voltage fuel cell assembly and a method for making the same, and more in particular this invention relates to a novel cell assembly utilizing a solid electrolyte.

In recent years there has been renewed interest in solid electrolyte fuel cells. These have been made in many forms, such as sheets, which require gas tight mountings of the sheets within the cell, so that a gaseous fuel may be introduced on one side of the cell with an oxidant introduced on the other side of the cell. This type of structure has many disadvantages, the principal one being that each single cell has to be individually mounted.

It has been proposed that cells be constructed in a series of hollow tubular elements which may then be telescopically drawn together so as to produce a series of cells having a central bore, which may be used as a means of contacting either the fuel and the oxidant with the solid electrolyte. It is necessary in producing cells of this type that each individual cell be joined to the one adjacent to it in such a manner that there is a gas tight union between the two. This produces two principal drawbacks: (1) that a large portion of the area of the composite tubular cell electrolyte is inactive since it is devoted to the joining of the adjacent cells; (2) that the joints between the individual segments must be gas tight. Development of an electrical conductive field that will remain stable and compatible at the high operating temperatures required for solid oxide electrolyte fuel cells is a problem.

It is an object of the present invention to provide a series of fuel cells of the solid electrolyte type that are unitarily constructed.

It is another object of this invention to produce an elongated tubular gas tight cell-stack that is constructed with its various elements unitarily formed in a self-supporting continuous tube rather than by the production and assembly of individual cells as heretofore.

It is a further object of this invention to have a fuel cell-stack having a voltage higher than that obtainable from an individual cell of the same overall dimensions.

It is a still further object of this invention to provide a tubular cell-stack having a series of electrodes on the interior of the tubular cells and a series of electrodes on the exterior of the tubular cells with a central layer of solid electrolyte, which partitions the cells into a fuel and oxidant chamber.

The wall of this tubular cell-stack, as stated above, comprises a series of interior electrodes which are separated by a central layer of solid electrolyte, which under the proper conditions, cause the electrons to flow from one electrode to another.

The various features of novelty which characterize this invention are pointed out wtih particularity in the claims annexed to and forming a part of this specification. For a better understanding of the invention, however, and its advantages and specific objects obtained with its use, reference is made to the accompanying drawings and descriptive matter in which is illustrated and described a preferred embodiment of the invention.

The drawings illustrate a method of manufacturing a tubular solid electrolyte fuel cell-stack, and the cell obtained by this process, wherein:

FIGURE 1 is a longitudinal, sectional view of a mandrel having a segmented electrode layer deposited thereon.

FIGURE 2 is similar to FIGURE 1, but shows the solid segmented electrolyte material deposited thereon.

FIGURE 3 is similar to FIGURE 2, but shows the second segmented electrode material.

FIGURE 4 is a sectional view of the finished cell after the mandrel has been removed.

Figure 5:
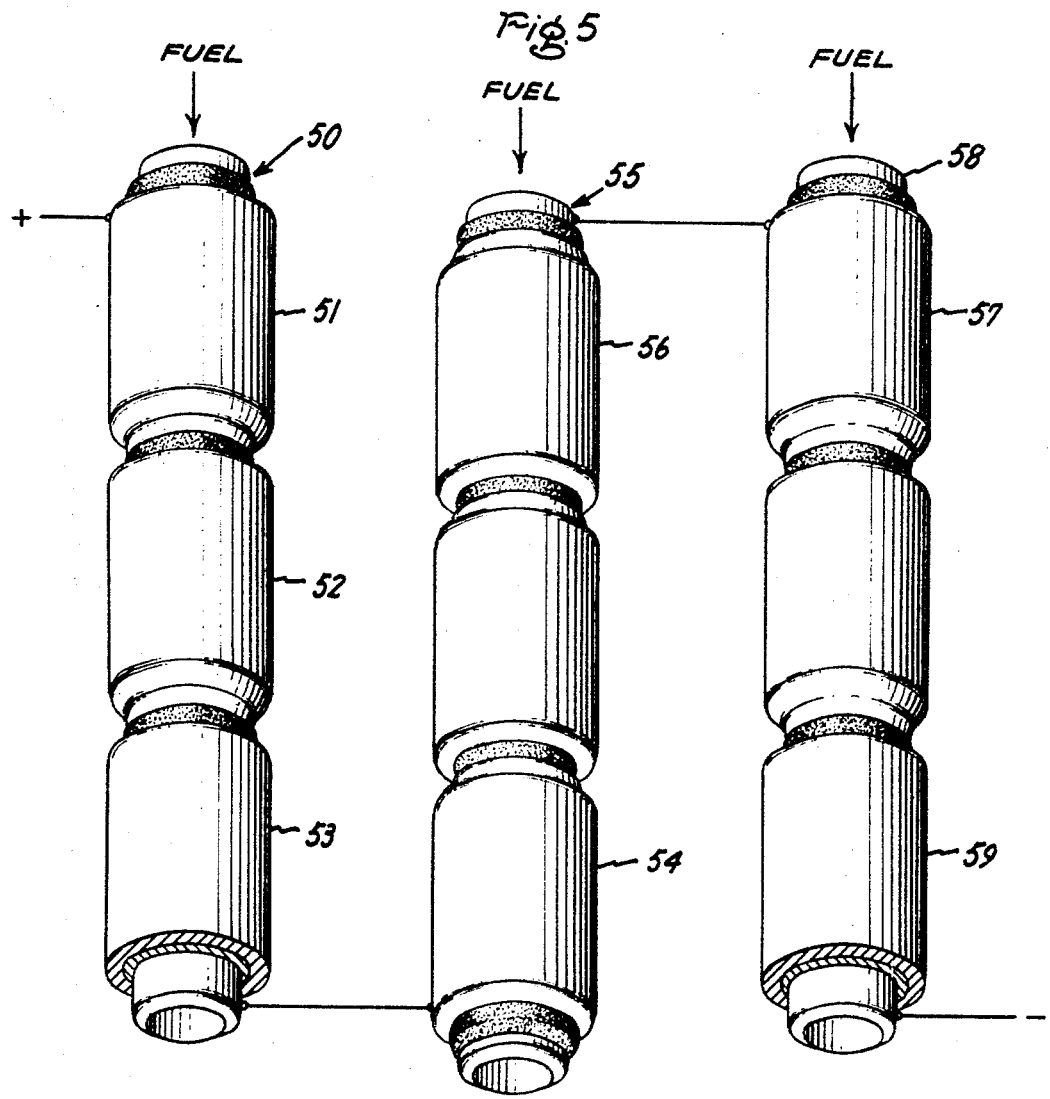
FIGURE 5 is a perspective view showing three 3-cell stacks and a method of interconnecting them.

A mandrel 20 has an electrode material deposited thereon in segments 21, 22, 23 and 24.

This deposition is performed by any of the usual methods such as slip casting, slurry spraying or painting. This operation preferably employs a mask which will prevent the deposition of the electrode material in a continuous coating on the mandrel 20 and form the openings 25, 26, 27 and 28 between the segments 21, 22, 23 and 24. These openings expose the mandrel 20 between the various segments.

By simply moving the mask a slight distance, it is then possible to apply to the mandrel and the segments thereon a coating of solid electrolyte material. These coatings will fill the openings 25, 26, 27 and 28 and overlie the segments of the electrode material 21, 22, 23 and 24 with the exception of a small gap near the end of each electrode material. The solid electrolyte layer 30, 31, 32, 33 and 34 have the openings therebetween 36, 37, 38 and 39, exposing a portion of the underlying electrode material. By moving the mask a short distance, there is then applied an outer layer of electrode material 40, 41, 42, 43 and 44, which overlies the solid electrolyte and forms contacts wtih the adjacent inner electrode material so as to form a cell-stack structure, as shown in FIGURE 4, after the removal of the mandrel 20, wherein the outer electrode 41 is connected to the inner electrode 21 and has the solid electrolyte layer 31 therebetween. The second cell, shown in FIGURE 4, has the outer electrode layer 42 connected to the inner electrode 22 and has the solid electrolyte layer 32 between the outer electrode 42 and the inner electrode 23. This forms a series of cells connected in series and is of a solid uniform construction. To enhance the mechanical and electrical bond or joint between the outer electrode of one fuel cell and the inner electrode of the adjacent fuel cell, a flash coating of a suitable material, such as chromium, may be provided on the exposed end portion of the inner electrode of each cell in the stack. This coating may be applied in any conventional manner but preferably will be of thickness of about one mil and thus will be in the form of an annular thin film so that the joint will be secure around its circumference.

The effective cell length L, shown in FIGURE 4, is that area of the solid electrolyte that lies completely between the inner and outer electrodes.

The composite tube may be heat-treated or sintered to obtain the desired physical characteristics. If intermediate heat treatments are needed, the starting mandrel can be removed at an earlier step, and the tube at that stage can itself serve as the material for the deposition of a subsequent layer. If the outer grooves, as between the outer segments of the electrode material 41 and 42, as an example, are objectionable, they may be filled in with the solid electrolyte material or another suitable material that is not conductive to electrons, so that the outer surface of the tubular cell will be a plane surface, as is the inner surface. This, of course, can be accomplished by mask depositing with the electrolyte or other electronically nonconductive material applied between the outer electrodes.

The cell-stack prepared in accordance with this invention is essentially gas tight and the gap between the effective cell length of adjacent cells is held to a minimum and there is no loss due to overlapping solid electrolyte layers heretofore used in connecting cells of this type.

Either the fuel or the oxidant may be supplied to the fuel cell through the hollow bore thereof and the other reacting material supplied to the outer surface of the cell.

As will be readily apparent to one skilled in the art, the present invention is applicable to any fuel cell utilizing a solid electrolyte.

Solid "stabilized" zirconia is an oxygen-ion transport medium which can be used as the electrolyte in such a high temperature fuel cell. "Stabilized" zirconia is a compound with a cubic crystal structure consisting of zirconia to which is added calcium oxide, yttrium oxide, or mixed rare earth oxides. Substantially pure zirconia, that is a compound with a monoclinic structure which is not "stabilized" by the addition of the above oxides, experiences volume changes when cycled thermally with resultant shattering of the material. Furthermore, substantially pure zirconia is not a low resistance ionic conductor. "Stabilized" zirconia is resistant to large volume changes upon thermally cycling and hence is mechanically stable. Additionally, "stabilized" zirconia serves as an oxygen-ion transport medium by virtue of the anion vacancies generated in the zirconia structure upon cationic substitution of calcium, yttrium or rare earth metals for zirconium.

The cathodes may be of any suitable material, such as platinum, lithiated nickel oxide, porous oxygen-ion conducting metal oxide matrix with silver impregnated in and filling the pores thereof or mixed conducting metal oxide. My preference for this purpose, however, is praseodymium cobaltate which is suitably provided in the form of a coating on the solid electrolyte surface as disclosed in copending application Ser. No. 645,288, filed June 12, 1967, in the name of Stephan P. Mitoff and assigned to the assignee hereof, the entire disclosure of which is incorporated herein by reference.

The anodes may be of any suitable material, such as platinum, an intimate dispersion of nickel in a compatible solid oxygen-ion conducting material; a solid oxygen-ion conducting metal oxide matrix, and silver impregnated in and filling the pores thereof or mixed conducting metal oxide. My preference, however, is a nickel electrode in the form of an adherent porous layer on the surface of a solid oxygen-ion electrolyte as disclosed and claimed in copending application Ser. No. 407,641, filed Oct. 30, 1964 in the name of Henry S. Spacil and assigned to the assignee hereof, the entire disclosure of which is incorporated herein by reference.

The current capacity of a fuel cell, unlike the potential, is a direct function of the surface area contributing to the electrochemical reaction while forming a composite cell as a series of segments or electrodes increases the potential between the cell terminals. The area per electrode rather than the overall surface area controls the current generated by the entire cell construction. For example, it will be apparent that the three cells connected in series, such as those underlying the end electrodes 41, 42 and 43 would be three times the length L or the sum of L, L' and L" and would be controlling as to the current capacity. That part of the cell-stack which does not comprise an electrolyte between two electrodes is shown by the length O and O' in FIGURE 4. This portion of the total length of the stack is held to a minimum in the construction set forth in this invention and it has been found in practice that the distance O between these cells in a cell-stack can be approximately 1 mm.

Higher voltages can be obtained by connecting these cells in series as shown in FIGURE 5. Cell-stack 50, which is composed of the individual cells 51, 52 and 53, has the fuel admitted to the bore thereof as shown in FIGURE 5. The outer electrode of cell 51 forms a positive terminal. The inner electrode of cell 53 is connected to the outer electrode of cell 54 in cell-stack 55 and the inner electrode of cell 56 is connected to the outer electrode of cell 57 in cell-stack 58 and the inner electrode of cell 59 is connected to the negative terminal. That is, the three cell-stacks 50, 55 and 58, each cell-stack having three individual cells, connected in series as all three cell-stacks are connected in series so as to give the desired voltage.

It will be readily appreciated by one skilled in the art that fuel cells may be constructed according to the present invention having a voltage output of any convenient integral multiple of voltages produced by each pair of adjacent cells. Thus, the fuel cells constructed according to the present invention possess a high degree of adaptability and by proper connection between the various cells, the voltage and output can be controlled.

Suitably, an assembly of these cells, as illustrated in FIGURE 5, may be provided with an enclosure, shell or housing as disclosed and claimed in my copending patent application Ser. No. 462,849, filed June 10, 1965, and entitled "Fuel Cells" and assigned to the assignee hereof.

While a preferred embodiment of the invention has been illustrated and described as required by law, it will be apparent to those skilled in the art, that it may be applied to other types of cell construction and changes may be made in the form of such cells to suit special conditions within the scope of this invention as set forth in the appended claims.

What I claim as new and desire to secure by Letters Patent of the United States is:

1. A high voltage fuel cell assembly comprising a plurality of tubular fuel cells arranged in end-to-end relation and electrically connected in series, each fuel cell comprising an inner tubular electrode of discrete length in longitudinal spaced relation to the inner electrode of an adjacent fuel cell of the assembly, a solid electrolyte of discrete length bridging between and contacting an end of the inner electrode and an opposed end of an adjacent fuel cell inner electrode and covering the greater portion of the outer surface of the said inner electrode, and an outer tubular electrode overlying said electrolyte and physically and electrically joined annularly at one end only to an opposed end portion of an adjacent fuel cell inner electrode.

2. The fuel cell assembly of claim 1 in which the greater part of the length of the electrolyte of each cell is disposed between the inner and the outer electrodes of the cell.

3. The fuel cell assembly of claim 1 in which the electrolyte consists of stabilized zirconia and the cathode consists of praseodymium cobaltate.

References Cited

UNITED STATES PATENTS

| | | | |
|---|---|---|---|
| 3,138,488 | 6/1964 | Tragert | 136—86 X |
| 3,311,504 | 3/1967 | Johnson | 136—86 |

ALLEN B. CURTIS, Primary Examiner